United States Patent
Heymans et al.

(10) Patent No.: US 9,803,051 B2
(45) Date of Patent: Oct. 31, 2017

(54) ACRYLIC POLYOL RESINS COMPOSITIONS

(71) Applicant: MOMENTIVE SPECIALTY CHEMICALS INC., Stafford, TX (US)

(72) Inventors: Denis Heymans, Ottignies-Louvain-la-Neuve (BE); Christophe Steinbrecher, Ottignies-Louvain-la-Neuve (BE); Cédric Le Fevere De Ten Hove, Ottignies-Louvain-la-Neuve (BE)

(73) Assignee: HEXION INC., Columbus, OH (US)

( * ) Notice: Subject to any disclaimer, the term of this patent is extended or adjusted under 35 U.S.C. 154(b) by 598 days.

(21) Appl. No.: 14/352,258

(22) PCT Filed: Oct. 16, 2012

(86) PCT No.: PCT/EP2012/004321
§ 371 (c)(1),
(2) Date: Apr. 16, 2014

(87) PCT Pub. No.: WO2013/056815
PCT Pub. Date: Apr. 25, 2013

(65) Prior Publication Data
US 2014/0248503 A1    Sep. 4, 2014

(30) Foreign Application Priority Data

Oct. 19, 2011  (EP) ..................................... 11075233
Apr. 5, 2012   (EP) ..................................... 12002491

(51) Int. Cl.
| | |
|---|---|
| *C08G 65/26* | (2006.01) |
| *C09D 163/00* | (2006.01) |
| *C08G 59/17* | (2006.01) |
| *C08F 283/02* | (2006.01) |
| *C08G 18/62* | (2006.01) |
| *C08F 283/00* | (2006.01) |
| *C08F 8/14* | (2006.01) |
| *C08F 220/14* | (2006.01) |
| *C08F 212/08* | (2006.01) |
| *C08F 222/14* | (2006.01) |
| *C09D 133/06* | (2006.01) |
| *C09D 151/08* | (2006.01) |
| *C09D 175/04* | (2006.01) |
| *C09D 171/02* | (2006.01) |
| *C09D 171/00* | (2006.01) |

(52) U.S. Cl.
CPC ............ *C08G 65/2615* (2013.01); *C08F 8/14* (2013.01); *C08F 212/08* (2013.01); *C08F 220/14* (2013.01); *C08F 222/14* (2013.01); *C08F 283/002* (2013.01); *C08F 283/02* (2013.01); *C08G 18/6237* (2013.01); *C08G 18/6254* (2013.01); *C08G 59/1466* (2013.01); *C09D 133/066* (2013.01); *C09D 151/08* (2013.01); *C09D 163/00* (2013.01); *C09D 171/00* (2013.01); *C09D 171/02* (2013.01); *C09D 175/04* (2013.01); *Y10T 428/31699* (2015.04); *Y10T 428/31935* (2015.04)

(58) Field of Classification Search
CPC ............ C08G 65/2615; C08G 59/1466; C08G 18/6237; C08F 283/02; C08F 283/002
See application file for complete search history.

(56) References Cited

U.S. PATENT DOCUMENTS

| | | | |
|---|---|---|---|
| 2,831,877 | A | 4/1958 | Koch et al. |
| 2,876,241 | A | 3/1959 | Koch et al. |
| 2,967,873 | A | 1/1961 | Moller et al. |
| 3,053,869 | A | 9/1962 | Knights et al. |
| 3,061,621 | A | 10/1962 | Koch et al. |
| 3,479,416 | A | 11/1969 | Tschopp et al. |
| 3,849,364 | A | 11/1974 | Vandenberg |
| 3,979,474 | A | 9/1976 | Zerrweck |
| 4,086,151 | A | 4/1978 | Stevens et al. |
| 5,051,492 | A | 9/1991 | Andre et al. |
| 5,681,906 | A | 10/1997 | Yezrielev et al. |
| 5,753,756 | A | 5/1998 | Aerts |
| 5,869,191 | A | 2/1999 | VanGaalen |
| 6,087,464 | A | 7/2000 | Swarup et al. |
| 6,121,389 | A | 9/2000 | Koojimans et al. |
| 6,136,991 | A | 10/2000 | Ryan et al. |
| 6,281,372 | B1 | 8/2001 | Wiese et al. |
| 6,433,217 | B1 | 8/2002 | Rosenbrand et al. |

(Continued)

FOREIGN PATENT DOCUMENTS

| | | |
|---|---|---|
| EP | 1227113 A1 | 7/2002 |
| EP | 1283226    | 2/2004 |

(Continued)

OTHER PUBLICATIONS

Hampshire, "Glycidyl Ester Based Hydroxylated Polyesters for Coatings and Adhesive Applications" Research Disclosure, Mason Publications, vol. 505, No. 44 (May 1, 2006) GB.

Hampshire, "Glycidyl Ester Based Hydroxylated Polyesters" Research Disclosure, Mason Publications, vol. 563, No. 16 (Mar. 1, 2011) p. 311, GB.

Kawasaki et al., "Low Pressure Koch Reaction by Cu(CO)n+-H2SO4—H3PO4—H2O Catalyst (Part 4) Structural Analysis . . . ", Sekiyu Gakkashi, vol. 37, No. 4, 1994, p. 448-454, Japan.

(Continued)

*Primary Examiner* — Nicole M Buie-Hatcher

(57) ABSTRACT

The invention relates to compositions of hydroxyl functional acrylic resins (acrylic polyols) comprising a mixture of α,α-branched alkane carboxylic glycidyl esters derived from butene oligomers characterized in that the sum of the concentration of the blocked and of the highly branched isomers is at least 50%, preferably above 60% and most preferably above 75% on total composition.

21 Claims, No Drawings

(56) References Cited

U.S. PATENT DOCUMENTS

| | | |
|---|---|---|
| 6,433,242 B1 | 8/2002 | Wiese |
| 6,592,944 B1 | 7/2003 | Uhlianuk et al. |
| 2005/0176979 A1* | 8/2005 | Stichter .................. C07C 51/14 554/176 |
| 2007/0082992 A1 | 4/2007 | Heybrechts |
| 2009/0137751 A1 | 5/2009 | Knott et al. |
| 2014/0005300 A1 | 1/2014 | Steinbrecher et al. |
| 2014/0227540 A1 | 8/2014 | Heymans et al. |
| 2014/0248501 A1 | 9/2014 | Heymans et al. |
| 2014/0248502 A1 | 9/2014 | Heymans et al. |
| 2014/0256906 A1 | 9/2014 | Steinbrecher et al. |
| 2014/0287252 A1 | 9/2014 | Heymans et al. |
| 2014/0295193 A1 | 10/2014 | Heymans et al. |
| 2014/0316030 A1 | 10/2014 | Le Fevere De Ten Hove et al. |

FOREIGN PATENT DOCUMENTS

| | | |
|---|---|---|
| JP | 6032803 | 2/1985 |
| JP | 60262821 | 12/1985 |
| WO | WO0125225 | 4/2001 |
| WO | WO01/56966 | 8/2001 |
| WO | WO0039180 | 10/2001 |
| WO | WO 2010/142396 A1 | 12/2010 |
| WO | WO 2012052126 A1 * | 4/2012 ............. C07C 51/15 |

OTHER PUBLICATIONS

Yoneda et al., "Carboxylation of Isobutylene and Related Olefins with Carbon . . . ", Bulletin of Japanese Petroleum Institute, vol. 14, No. 2, Nov. 1972, p. 178-186, Japan.

* cited by examiner

ACRYLIC POLYOL RESINS COMPOSITIONS

RELATED APPLICATION DATA

This application claims the benefit of PCT Application PCT/EP2012/004321 with an International Filing Date of Oct. 16, 2012, published as WO 2013/056815 A1, which further claims priority to European Patent Application No. EP11075233.4 filed Oct. 19, 2011 and European Patent Application No. EP 12002491.4 filed Apr. 5, 2012; the entire contents of all are hereby incorporated by reference.

The present invention relates to a composition of acrylic polyol resins based on a composition of hydroxyl functional acrylic resins (acrylic polyols) comprising a mixture of $\alpha,\alpha$-branched alkane carboxylic glycidyl esters derived from butene oligomers, which lead for example to improved hardness of the coatings derived thereof.

More in particular the invention relates to acrylic polyol resins compositions comprising aliphatic tertiary saturated carboxylic acids or $\alpha,\alpha$-branched alkane carboxylic acids, which contain 9 or 13 carbon atoms and which provide glycidyl esters with a branching level of the alkyl groups depending on the olefin feedstock used and/or the oligomerization process thereof, and which is defined as below.

The glycidyl ester derived from olefins containing 5 to 10 carbon atoms in the alkyl chain are used by the industry to introduce modified resins by reaction such a glycidyl ester with acrylic resins, such as given in U.S. Pat. No. 6,136,991.

It is generally known from e.g. U.S. Pat. No. 2,831,877, U.S. Pat. No. 2,876,241, U.S. Pat. No. 3,053,869, U.S. Pat. No. 2,967,873 and U.S. Pat. No. 3,061,621 that mixtures of $\alpha,\alpha$-branched alkane carboxylic acids can be produced, starting from mono-olefins, such as butenes and isomers such as isobutene, carbon monoxide and water, in the presence of a strong acid.

The glycidyl esters can be obtained according to PCT/EP2010/003334 or the U.S. Pat. No. 6,433,217.

We have discovered that well chosen blend of isomers of the glycidyl ester of, for example, neononanoic acids give different and unexpected performance in combination with some particular polymers such as acrylic polyols.

The isomers are described in Table 1 and illustrated in Scheme 1.

We have found that the performance of the glycidyl ester compositions derived from the branched acid is depending on the branching level of the alkyl groups $R^1$, $R^2$ and $R^3$, for example the neononanoic acid has 3, 4 or 5 methyl groups. Highly branched isomers are defined as isomers of neo-acids having at least 5 methyl groups.

Neo-acids, for example neononanoic acids (V9) with a secondary or a tertiary carbon atoms in the $\beta$ position are defined as blocking isomers.

Mixture compositions of neononanoic acids glycidyl esters providing for example a high hardness of a coating, is a mixture where the sum of the concentration of the blocked and of the highly branched isomers is at least 50%, preferably above 60% and most preferably above 75% on total composition.

The composition of the glycidyl ester mixture is comprising 2,2-dimethyl 3,3-dimethyl pentanoic acid glycidyl ester or 2-methyl 2-isopropyl 3-methyl butanoic acid glycidyl ester or 2-methyl 2-ethyl 3,3-dimethyl butanoic acid glycidyl ester.

The composition of the glycidyl ester mixture is comprising 2,2-dimethyl 3-methyl 4-methyl pentanoic acid glycidyl ester and 2,2-dimethyl 4,4-dimethyl pentanoic acid glycidyl ester.

The composition of the glycidyl ester mixture in which the sum of the following content of glycidyl ester mixture, comprising 2,2-dimethyl 3,3-dimethyl pentanoic acid glycidyl ester and 2-methyl 2-isopropyl 3-methyl butanoic acid glycidyl ester and 2-methyl 2-ethyl 3,3-dimethyl butanoic acid glycidyl ester, is above 10% weight, preferably above 15% weight and most preferably above 25% weight on total composition.

The composition of the glycidyl ester mixture in which the sum of the following content of glycidyl ester mixture, comprising 2,2-dimethyl 3,3-dimethyl pentanoic acid glycidyl ester and 2-methyl 2-isopropyl 3-methyl butanoic acid glycidyl ester and 2-methyl 2-ethyl 3,3-dimethyl butanoic acid glycidyl ester and 2,2-dimethyl 3-methyl 4-methyl pentanoic acid glycidyl ester and 2,2-dimethyl 4,4-dimethyl pentanoic acid glycidyl ester, is above 40% weight, preferably above 50% weight and most preferably above 60% weight on total composition.

The composition of the glycidyl ester mixture in which the content of 2-methyl 2-ethyl hexanoic acid glycidyl ester is below 40% weight, preferably below 30% weight and most preferably below 20% weight on total composition.

The composition of the glycidyl ester mixture in which the glycidyl ester mixture is comprising 2,2-dimethyl 3,3-dimethyl pentanoic acid glycidyl ester in 1 to 99 weight % or 2-methyl 2-isopropyl 3-methyl butanoic acid glycidyl ester in 1 to 99 weight % or 2-methyl 2-ethyl 3,3-dimethyl butanoic acid glycidyl ester in 1 to 99 weight % on total composition.

A preferred composition of the glycidyl ester mixture in which the glycidyl ester mixture is comprising 2,2-dimethyl 3,3-dimethyl pentanoic acid glycidyl ester in 2 to 50 weight % or 2-methyl 2-isopropyl 3-methyl butanoic acid glycidyl ester in 5 to 50 weight % or 2-methyl 2-ethyl 3,3-dimethyl butanoic acid glycidyl ester in 3 to 60 weight % on total composition.

A further preferred composition of the glycidyl ester mixture in which the glycidyl ester mixture is comprising 2,2-dimethyl 3,3-dimethyl pentanoic acid glycidyl ester in 3 to 40 weight % or 2-methyl 2-isopropyl 3-methyl butanoic acid glycidyl ester in 10 to 35 weight % or 2-methyl 2-ethyl 3,3-dimethyl butanoic acid glycidyl ester in 5 to 40 weight % on total composition.

The composition of the glycidyl ester mixture in which the glycidyl ester mixture is comprising 2,2-dimethyl 3-methyl 4-methyl pentanoic acid glycidyl ester in 1 to 99 weight % or 2,2-dimethyl 4,4-dimethyl pentanoic acid glycidyl ester in 0.1 to 99 weight %.

A preferred composition of the glycidyl ester mixture in which the glycidyl ester mixture is comprising 2,2-dimethyl 3-methyl 4-methyl pentanoic acid glycidyl ester in 2 to 50 weight % or 2,2-dimethyl 4,4-dimethyl pentanoic acid glycidyl ester in 0.1 to 80 weight %.

A further preferred composition of the glycidyl ester mixture in which the glycidyl ester mixture is comprising 2,2-dimethyl 3-methyl 4-methyl pentanoic acid glycidyl ester in 4 to 25 weight % or 2,2-dimethyl 4,4-dimethyl pentanoic acid glycidyl ester in 0.2 to 45 weight %.

The above glycidyl esters compositions can be used for example, is as reactive diluent or as monomer in binder compositions for paints or adhesives.

The glycidyl esters compositions can be used as reactive diluent for epoxy based formulations such as exemplified in the technical brochure of Momentive (Product Bulletin: Cardura E10P The Unique Reactive Diluent MSC-521).

Other uses of the glycidyl ester are the combinations with polyester polyols, or acrylic polyols, or polyether polyols.

The combination with acrylic polyols such as the one used in the car industry coating leads to a fast drying coating system with attractive coating properties.

Methods Used

The isomer distribution of neo-acid can be determined using gas chromatography, using a flame ionization detector (FID). 0.5 ml sample is diluted in analytical grade dichloromethane and n-octanol may be used as internal standard. The conditions presented below result in the approximate retention times given in Table 1. In that case n-octanol has a retention time of approximately 8.21 minute.

The GC method has the following settings:

| Column | CP Wax 58 CB (FFAP), 50 m × 0.25 mm, df = 0.2 μm |
|---|---|
| Oven program | 150° C. (1.5 min) – 3.5° C./min – 250° C. (5 min) = 35 min |
| Carrier gas | Helium |
| Flow | 2.0 mL/min constant |
| Split flow | 150 mL/min |
| Split ratio | 1:75 |
| Injector temp | 250° C. |
| Detector temp | 325° C. |
| Injection volume | 1 μL |

CP Wax 58 CB is a Gas chromatography column available from Agilent Technologies.

The isomers of neononanoic acid as illustrative example have the structure $(R^1R^2R^3)$—C—COOH where the three R groups are linear or branched alkyl groups having together a total of 7 carbon atoms.

The structures and the retention time, using the above method, of all theoretical possible neononanoic isomers are drawn in Scheme 1 and listed in Table 1.

The isomers content is calculated from the relative peak area of the chromatogram obtained assuming that the response factors of all isomers are the same.

TABLE 1

Structure of all possible neononanoic isomers

| | R1 | R2 | R3 | Methyl groups | Blocking | Retention time [Minutes] |
|---|---|---|---|---|---|---|
| V901 | Methyl | Methyl | n-pentyl | 3 | No | 8.90 |
| V902 | Methyl | Methyl | 2-pentyl | 4 | Yes | 9.18 |
| V903 | Methyl | Methyl | 2-methyl butyl | 4 | No | 8.6 |
| V904 | Methyl | Methyl | 3-methyl butyl | 4 | No | 8.08 |
| V905 | Methyl | Methyl | 1,1-dimethyl propyl | 5 | Yes | 10.21 |
| V906 | Methyl | Methyl | 1,2-dimethy propyl | 5 | Yes | 9.57 |
| V907 | Methyl | Methyl | 2,2-dimethyl propyl | 5 | No | 8.26 |
| V908 | Methyl | Methyl | 3-pentyl | 4 | Yes | 9.45 |
| V909 | Methyl | Ethyl | n-butyl | 3 | No | 9.28 |
| V910 K1 | Methyl | Ethyl | s-butyl | 4 | Yes | 9.74 |
| V910 K2 | Methyl | Ethyl | s-butyl | 4 | Yes | 9.84 |
| V911 | Methyl | Ethyl | i-butyl | 4 | No | 8.71 |
| V912 | Methyl | Ethyl | t-butyl | 5 | Yes | 9.64 |
| V913 | Methyl | n-propyl | n-propyl | 3 | No | 8.96 |
| V914 | Methyl | n-propyl | i-propyl | 4 | Yes | 9.30 |
| V915 | Methyl | i-propyl | i-propyl | 5 | Yes | 9.74 |
| V916 | Ethyl | Ethyl | n-propyl | 3 | No | 9.44 |
| V917 | Ethyl | Ethyl | i-propyl | 4 | Yes | 10.00 |

The isomer distribution of neo-acid can be determined using gas chromatography, using a flame ionization detector (FID). 0.5 ml sample is diluted in analytical grade dichloromethane and n-octanol may be used as internal standard. The conditions presented below result in the approximate retention times given in Table 1. In that case n-octanol has a retention time of approximately 8.21 minute.

The GC method has the following settings:

| Column | CP Wax 58 CB (FFAP), 50 m × 0.25 mm, df = 0.2 μm |
|---|---|
| Oven program | 150° C. (1.5 min) – 3.5° C./min – 250° C. (5 min) = 35 min |
| Carrier gas | Helium |
| Flow | 2.0 mL/min constant |
| Split flow | 150 mL/min |
| Split ratio | 1:75 |
| Injector temp | 250° C. |
| Detector temp | 325° C. |
| Injection volume | 1 μL |

CP Wax 58 CB is a Gas chromatography column available from Agilent Technologies.

The isomers of glycidyl esters of neononanoic acid as illustrative example have the structure $(R^1R^2R^3)$—C—COO—CH$_2$—CH(O)CH$_2$ where the three R groups are linear or branched alkyl groups having together a total of 7 carbon atoms.

The structures and the retention time, using the above method, of all theoretical possible neononanoic isomers are drawn in Scheme 1 and listed in Table 1.

The isomers content is calculated from the relative peak area of the chromatogram obtained assuming that the response factors of all isomers are the same.

GC-MS method can be used to identify the various isomers providing that the analysis is done by a skilled analytical expert.

Scheme 1: Structure of all possible neononanoic isomers

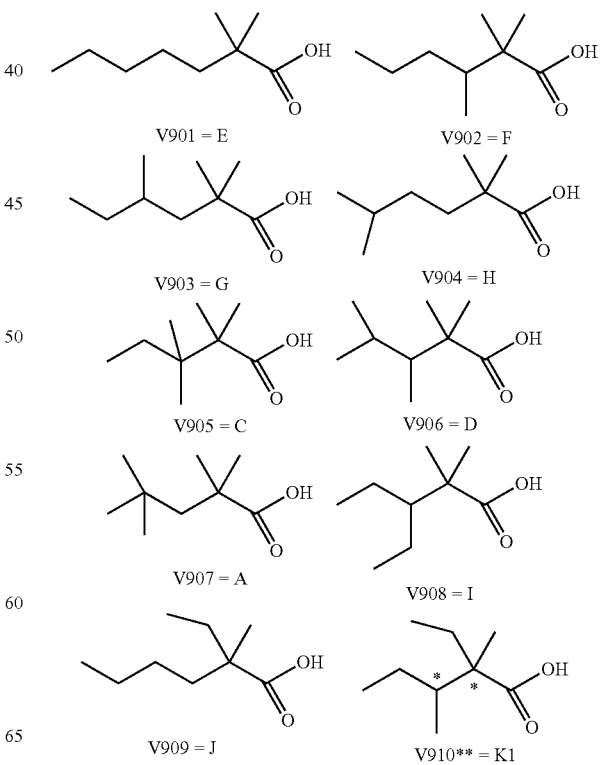

V901 = E
V902 = F
V903 = G
V904 = H
V905 = C
V906 = D
V907 = A
V908 = I
V909 = J
V910** = K1

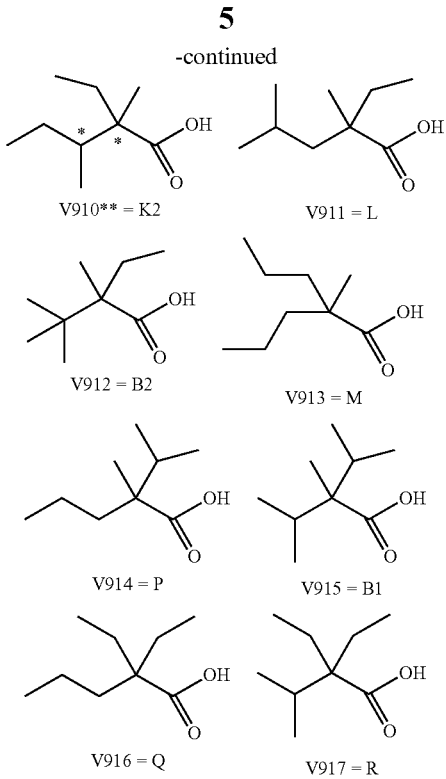

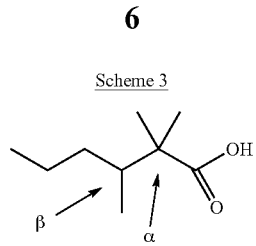

Scheme 2: Example of a Non-Blocked V9 Structure

Scheme 3: Example of a Blocked V9 Structure

The use of the glycidyl esters compositions, discussed here above, can be as monomer in binder compositions for paints and adhesives. These binders can be based on an acrylic polyol resin comprising the above composition glycidyl.

The acrylic polyol resins of the invention are based on a composition of hydroxyl functional acrylic resins (acrylic polyols) comprising a mixture of α,α-branched alkane carboxylic glycidyl esters derived from butene oligomers characterized in that the sum of the concentration of the blocked and of the highly branched isomers is at least 50%, preferably above 60% and most preferably above 75% on total composition.

A preferred composition is that the glycidyl ester mixture is based on neononanoic (C9) acid mixture where the sum of the concentration of the blocked and of the highly branched isomers is at least 50%, preferably above 60% and most preferably above 75% on total composition.

Further the neononanoic (C9) glycidyl ester mixture is comprising 2,2-dimethyl 3,3-dimethyl pentanoic acid glycidyl ester or 2-methyl 2-isopropyl 3-methyl butanoic acid glycidyl ester or 2-methyl 2-ethyl 3,3-dimethyl butanoic acid glycidyl ester.

Another embodiment is that the composition of the glycidyl ester mixture is comprising 2,2-dimethyl 3-methyl 4-methyl pentanoic acid glycidyl ester or 2,2-dimethyl 4,4-dimethyl pentanoic acid glycidyl ester.

A further embodiment is that the composition of the glycidyl ester mixture is comprising the sum of the following content of glycidyl ester mixture, comprising 2,2-dimethyl 3,3-dimethyl pentanoic acid glycidyl ester and 2-methyl 2-isopropyl 3-methyl butanoic acid glycidyl ester and 2-methyl 2-ethyl 3,3-dimethyl butanoic acid glycidyl ester, is above 10% weight, preferably above 15% weight and most preferably above 25% weight on total composition.

A further embodiment is that the composition of the glycidyl ester mixture is comprising the sum of the following content of glycidyl ester mixture, comprising 2,2-dimethyl 3,3-dimethyl pentanoic acid glycidyl ester and 2-methyl 2-isopropyl 3-methyl butanoic acid glycidyl ester and 2-methyl 2-ethyl 3,3-dimethyl butanoic acid glycidyl ester and 2,2-dimethyl 3-methyl 4-methyl pentanoic acid glycidyl ester and 2,2-dimethyl 4,4-dimethyl pentanoic acid glycidyl ester, is above 40% weight, preferably above 50% weight and most preferably above 60% weight on total composition.

A further embodiment is that the composition of the glycidyl ester mixture is comprising 2-methyl 2-ethyl

Methods for the Characterization of the Resins

The molecular weights of the resins are measured with gel permeation chromatography (Perkin Elmer/Water) in THF solution using polystyrene standards. Viscosity of the resins are measured with Brookfield viscometer (LVDV-I) at indicated temperature. Solids content are calculated with a function (Ww−Wd)/Ww×100%. Here Ww is the weight of a wet sample, Wd is the weight of the sample after dried in an oven at a temperature 110° C. for 1 hour.

Tg (glass transition temperature) has been determined either with a DSC 7 from Perkin Elmer or with an apparatus from TA Instruments Thermal Analysis. Scan rates were respectively 20 and 10° C./min. Only data obtained in the same experimental conditions have been compared. If not, the temperature difference occurring from the different scanning rate has been proved not significant for the results compared.

Blocking Isomers

Whereas the carbon atom in alpha position of the carboxylic acid is always a tertiary carbon atom, the carbon atom(s) in β position can either be primary, secondary or tertiary. Neononanoic acids (V9) with a secondary or a tertiary carbon atoms in the β position are defined as blocking (blocked) isomers (Schemes 2 and 3).

Scheme 2

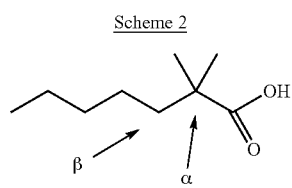

hexanoic acid glycidyl ester is below 40% weight, preferably below 30% weight and most preferably below 20% weight on total composition.

A further embodiment is that the composition of the glycidyl ester mixture is comprising 2,2-dimethyl 3,3-dimethyl pentanoic acid glycidyl ester in 1 to 99 weight % or 2-methyl 2-isopropyl 3-methyl butanoic acid glycidyl ester in 1 to 99 weight % or 2-methyl 2-ethyl 3,3-dimethyl butanoic acid glycidyl ester in 1 to 99 weight % on total composition and a prefer is in that the glycidyl ester mixture is comprising 2,2-dimethyl 3,3-dimethyl pentanoic acid glycidyl ester in 2 to 50 weight % or 2-methyl 2-isopropyl 3-methyl butanoic acid glycidyl ester in 5 to 50 weight % or 2-methyl 2-ethyl 3,3-dimethyl butanoic acid glycidyl ester in 3 to 60 weight % on total composition, and a most prefer composition is that the glycidyl ester mixture is comprising 2,2-dimethyl 3,3-dimethyl pentanoic acid glycidyl ester in 3 to 40 weight % or 2-methyl 2-isopropyl 3-methyl butanoic acid glycidyl ester in 10 to 35 weight % or 2-methyl 2-ethyl 3,3-dimethyl butanoic acid glycidyl ester in 5 to 40 weight % on total composition.

A further embodiment is that the composition of the glycidyl ester mixture is comprising 2,2-dimethyl 3-methyl 4-methyl pentanoic acid glycidyl ester in 1 to 99 weight % or 2,2-dimethyl 4,4-dimethyl pentanoic acid glycidyl ester in 0.1 to 99 weight %, a preferred composition is that the glycidyl ester mixture is comprising 2,2-dimethyl 3-methyl 4-methyl pentanoic acid glycidyl ester in 2 to 50 weight % or 2,2-dimethyl 4,4-dimethyl pentanoic acid glycidyl ester in 0.1 to 80 weight %, and a most preferred composition is that the glycidyl ester mixture is comprising 2,2-dimethyl 3-methyl 4-methyl pentanoic acid glycidyl ester in 4 to 25 weight % or 2,2-dimethyl 4,4-dimethyl pentanoic acid glycidyl ester in 0.2 to 45 weight %.

The invention is also about the process to prepare the acrylic polyol resins compositions, which are obtained by the incorporation of the mixture of α,α-branched alkane carboxylic glycidyl esters, as characterized above, into a hydroxyl functional acrylic resins by the reaction of the epoxy group with the carboxylic acid group of ethylene carboxylic acid compounds from hydroxyl ethylene carboxylate ester monomers which are then reacted with one or more unsaturated monomers via a radical polymerization reaction, in one step or more.

The ethylene carboxylic acid compounds are for example acrylic acid, methacrylic acid, and the like.

The other unsaturated monomers are selected from the group consisting of octyl acrylate, octyl methacrylate, nonyl acrylate, nonyl methacrylate, decyl acrylate, decyl methacrylate, undecyl acrylate, undecyl methacrylate, dodecyl acrylate, dodecyl methacrylate, isodecyl acrylate, isodecyl methacrylate, isotridecyl acrylate, isotridecyl methacrylate, tridecyl acrylate, tridecyl methacrylate, tridecyl acrylate, tridecyl methacrylate, stearyl acrylate, and stearyl methacrylate, lauryl acrylate, lauryl methacrylate, styrene, alpha-methyl styrene, C1 to C10 (cyclo)alkyl acrylate, acrylic acid, methacrylic acid, maleic acid, fumaric acid or a combination thereof.

A further process to prepare the acrylic polyol resins of the invention are cooking it while having a polyester polyol or a polyether polyol or a mixture thereof as initial reactor charge.

The acrylic polyol resins of the invention prepared according to the above processes will have a calculated hydroxyl value between 50 and 180 mgKOH/g on solid and or the number average molecular weight (Mn) is between 2500 and 50000 Dalton according polystyrene standard.

The invention is also related to a binder composition useful for coating composition comprising at least any hydroxyl functional acrylic resins as prepared above. The said binder compositions are suitable for coating metal or plastic substrates.

EXAMPLES

Chemicals Used
  Cardura™ E10: available from Momentive Specialty Chemicals
  Neononanoic glycidyl ester from Momentive Specialty Chemicals
  GE9S: neononanoic glycidyl ester of composition A (see Table 2)
  GE9H: neononanoic glycidyl ester of composition B (see Table 2)
  Neononanoic glycidyl ester of composition C (see Table 2)
  Neononanoic glycidyl ester of composition D (see Table 2)
  Neononanoic glycidyl ester of composition E (see Table 2)

TABLE 2

Composition of the neononanoic glycidyl ester
(according to the described gas chromatography
method for glycidyl esters of neo-acid)

| | Glycidyl ester of acid V9XX (described in Table 1) | | | | |
|---|---|---|---|---|---|
| | A (%) | B (%) | C (%) | D (%) | E (%) |
| V901 | 6.5 | 0.1 | 3.7 | 0.1 | 0.1 |
| V902 | 0.6 | 2.55 | 0.6 | 2.4 | 2.65 |
| V903 | 1.1 | 0.7 | 0.3 | 1.0 | 0.4 |
| V904 | 0.8 | 1 | 0.1 | 2.2 | 0.4 |
| V905 | 0.2 | 13.1 | 0.5 | 4.1 | 14.5 |
| V906 | 0.4 | 11.6 | 0.4 | 9.6 | 12.6 |
| V907 | 0.2 | 15.4 | 0.1 | 36.4 | 5.6 |
| V908 | 0.1 | 0 | 0.1 | 0.0 | 0.0 |
| V909 | 54.8 | 2.55 | 52.8 | 2.4 | 2.65 |
| V910 K1 | 7.8 | 0 | 10.0 | 0.0 | 0.0 |
| V910 K2 | 7.7 | 0.6 | 12.8 | 0.4 | 0.7 |
| V911 | 2.4 | 1.2 | 0.7 | 2.0 | 0.8 |
| V912 | 0.0 | 28.3 | 0.0 | 22.4 | 33.5 |
| V913 | 6.8 | 0.1 | 6.4 | 0.1 | 0.1 |
| V914 | 4.5 | 0 | 3.8 | 0.0 | 0.0 |
| V915 | 0.6 | 22.3 | 0.6 | 16.8 | 25.3 |
| V916 | 4.4 | 0.1 | 5.2 | 0.1 | 0.1 |
| V917 | 1.1 | 0.4 | 2.1 | 0.1 | 0.4 |

GE5: glycidyl ester of pivalic acid obtained by reaction of the acid with epichlorhydrin.
Ethylene glycol from Aldrich
Monopentaerythritol: available from Sigma-Aldrich
3,3,5 Trimethyl cyclohexanol: available from Sigma-Aldrich
Maleic anhydride: available from Sigma-Aldrich
Methylhexahydrophtalic anhydride: available from Sigma-Aldrich
Hexahydrophtalic anhydride: available from Sigma-Aldrich
Boron trifluoride diethyl etherate (BF3.OEt2) from Aldrich
Acrylic acid: available from Sigma-Aldrich
Methacrylic acid: available from Sigma-Aldrich
Hydroxyethyl methacrylate: available from Sigma-Aldrich
Styrene: available from Sigma-Aldrich
2-Ethylhexyl acrylate: available from Sigma-Aldrich Methyl methacrylate: available from Sigma-Aldrich
Butyl acrylate: available from Sigma-Aldrich
Di-t-Amyl Peroxide is Luperox DTA from Arkema
tert-Butyl peroxy-3,5,5-trimethylhexanoate: available from Akzo Nobel
Xylene
n-Butyl Acetate from Aldrich
Dichloromethane from Biosolve
Thinner: A: is a mixture of Xylene 50 wt %, Toluene 30 wt %, ShellsolA 10 wt %, 2-Ethoxyethylacetate 10 wt %. Thinner B: is butyl acetate
Curing agents, HDI: 1,6-hexamethylene diisocyanate trimer, Desmodur N3390 BA from Bayer Material Science or Tolonate HDT LV2 from Perstorp
Leveling agent: 'BYK 10 wt %' which is BYK-331 diluted at 10% in butyl acetate
Catalyst: 'DBTDL 1 wt %' which is Dibutyl Tin Dilaurate diluted at 1 wt % in butyl acetate
Catalyst: 'DBTDL 10 wt %' which is Dibutyl Tin Dilaurate diluted at 10 wt % in butyl acetate Example 01 Comparative The following constituents were charged to a reaction vessel equipped with a stirrer, a condenser and a thermometer: 92.4 grams of GE9S, 24.0 grams of Butyl Acetate. That initial reactor charge has been heated up to 135° C. Then, the following mixture was added over a period of 1 h 20 while keeping the temperature constant: 30.7 grams of acrylic acid, 1.2 grams of Di-t-Amyl Peroxide, 12.0 grams of n-Butyl Acetate. After further adding 1.2 grams of Di-t-Amyl Peroxide and 20.4 grams of n-Butyl Acetate, a post-cooking was pursued at 135° C. for 1 h. The acrylic polyol had a molecular weight (Mw) of 11400 Daltons and a Tg of about −10° C.

Example 02

The following constituents were charged to a reaction vessel equipped with a stirrer, a condenser and a thermometer: 92.4 grams of GE9H, 24.0 grams of Butyl Acetate. That initial reactor charge has been heated up to 135° C. Then, the following mixture was added over a period of 1 h 18 while keeping the temperature constant: 30.2 grams of acrylic acid, 1.2 grams of Di-t-Amyl Peroxide, 12.0 grams of n-Butyl Acetate. After further adding 1.2 grams of Di-t-Amyl Peroxide and 20.4 grams of n-Butyl Acetate, a post-cooking was pursued at 135° C. for 1 h. The acrylic polyol had a molecular weight (Mw) of 8600 Daltons and a Tg of about +26° C.

Observations:
Tg of acrylic polyols is impacted by the composition of the neononanoic glycidyl ester (see examples 01, 02).

Example 03 Comparative

The following constituents were charged to a reaction vessel equipped with a stirrer, a condenser and a thermometer: 115.5 grams of Cardura™ E10, 30.0 grams of Butyl Acetate. That initial reactor charge has been heated up to 135° C. Then, the following mixture was added over a period of 6 h while keeping the temperature constant: 42.3 grams of methacrylic acid, 1.5 grams of Di-t-Amyl Peroxide. After further adding 1.5 grams of Di-t-Amyl Peroxide and 9.0 grams of n-Butyl Acetate, a post-cooking was pursued at 135° C. for 1 h. Finally, 39.0 grams of n-Butyl Acetate has been added. A sample has been mixed in a test tube with Methanol (proportion 1:10) under magnetic agitation. Once solution was homogenous, drops of demi water were added in order to get homogenous precipitation (white coloration). After ±2 hours of resting, the bottom of the test tube is recovered and dried in a vacuum oven at 120° C. for several days. The acrylic polyol had a molecular weight (Mw) of 19500 Daltons and a Tg of about +27° C.

Example 04

The following constituents were charged to a reaction vessel equipped with a stirrer, a condenser and a thermometer: 115.5 grams of GE9H, 30.0 grams of Butyl Acetate. That initial reactor charge has been heated up to 135° C. Then, the following mixture was added over a period of 6 h while keeping the temperature constant: 44.8 grams of methacrylic acid, 1.6 grams of Di-t-Amyl Peroxide. After further adding 1.5 grams of Di-t-Amyl Peroxide and 9.0 grams of n-Butyl Acetate, a post-cooking was pursued at 135° C. for 1 h. Finally, 39.0 grams of n-Butyl Acetate has been added. A sample has been mixed in a test tube with Methanol (proportion 1:10) under magnetic agitation. Once solution was homogenous, drops of demi water were added in order to get homogenous precipitation (white coloration). After ±2 hours of resting, the bottom of the test tube is recovered and dried in a vacuum oven at 120° C. for several days. The acrylic polyol had a molecular weight (Mw) of 15300 Daltons and a Tg of about +57° C.

Example 05

The Adducts of Glycidyl Neononanoate, GE9H and Acrylic Acid or Methacrylic Acid
The adducts of Glycidyl neononanoate GE9H (see Table 3) with acrylic acid (ACE-adduct) and with methacrylic acid (MACE-adduct) are acrylic monomers that can be used to formulate hydroxyl functional (meth)acrylic polymers.

TABLE 3

Compositions of the adducts intakes in parts by weight

|  | Acrylic acid adduct | Meth acrylic acid adduct |
|---|---|---|
| Initial reactor charge |  |  |
| GE9H | 250 | 250 |
| Acrylic acid | 80 |  |
| Methacrylic acid |  | 96.5 |
| Radical Inhibitor |  |  |
| 4-Methoxy phenol | 0.463 | 0.463 |
| Catalyst |  |  |
| DABCO T9 (0.07 wt % on Glycidyl ester) | 0.175 | 0.175 |

DABCO T9 and 4-Methoxy phenol (185 ppm calculated on glycidyl ester weight), are charged to the reactor.
The reaction is performed under air flow (in order to recycle the radical inhibitor).
The reactor charge is heated slowly under constant stirring to about 80° C., where an exothermic reaction starts, increasing the temperature to about 100° C.
The temperature of 100° C. is maintained, until an Epoxy Group Content below 30 meq/kg is reached.
The reaction mixture is cooled to room temperature.

Example 06

Acrylic Resins for High Solids Automotive Refinish Clearcoats
A glass reactor equipped with stirrer was flushed with nitrogen, and the initial reactor charge (see Table 4) heated to 160° C. The monomer mixture including the initiator was then gradually added to the reactor via a pump over 4 hours at this temperature. Additional initiator was then fed into the reactor during another period of 1 hour at 160° C. Finally the polymer is cooled down to 135° C. and diluted to a solids content of about 68% with xylene.

TABLE 4

Acrylic resins recipe

|  | Weight % | in Reactor 1 L (g) |
|---|---|---|
| Initial Reactor Charge | | |
| GE9H or GE9S (Comparative) | 28.2 | 169.1 |
| Xylene | 2.7 | 16.2 |
| Feeding materials | | |
| Acrylic acid | 10 | 59.8 |
| Hydroxy ethyl methacrylate | 16.0 | 96.0 |
| Styrene | 30.0 | 180.0 |
| Methyl methacrylate | 15.8 | 95.0 |
| Di t-Amyl peroxide | 4.0 | 24.0 |
| Xylene | 8.3 | 49.8 |
| Post cooking | | |
| Di t-Amyl peroxide | 1.0 | 6.0 |
| Xylene | 3.0 | 18.0 |
| Solvent adding at 130° C. | | |
| Xylene | 50.8 | 305.0 |
| Final solids content | 61.8% | |
| Hydroxyl content | 4.12% | |

Example 07

Clear Coats for Automotive Refinish

Solvents were blended to yield a thinner mixture of the following composition (Table 5):

TABLE 5

Thinner composition

| Thinner | Weight % in solvent blend, theory |
|---|---|
| Toluene | 30.1% |
| ShellSolA | 34.9% |
| 2-ethoxyethyl acetate | 10.0% |
| n-Butyl acetate | 25.0% |
| Total | 100% |

A clearcoat was then formulated (Table 6) with the following ingredients (parts by weight):

TABLE 6

Clearcoat formulation

| Resin of example ex 06 | Desmodur N3390 | BYK 10 wt % in ButAc | DBTDL 1 wt % in ButAc | Thinner |
|---|---|---|---|---|
| 80.1 | 27.01 | 0.53 | 1.17 | 40.45 |

| Clearcoat properties | GE9H | GE9S (Comparative) |
|---|---|---|
| Volatile organic content | 480 g/l | 481 g/l |
| Initial viscosity | 54 cP | 54 cP |
| Dust free time | 12 minutes | 14.5 minutes |
| Koenig Hardness after 6 hours | 8.3 s | 7.1 s |

Example 08

Acrylic Resins for First Finish Automotive Topcoats

GE9H based (28%) acrylic polymers for medium solids first-finish clear coats

A reactor for acrylic polyols is flushed with nitrogen and the initial reactor charge (see Table 7) heated to 140° C. At this temperature the monomer mixture including the initiator is added over 4 hours to the reactor via a pump. Additional initiator is fed into the reactor during one hour, and then the mixture is kept at 140° C. to complete the conversion in a post reaction. Finally the polymer is cooled down and diluted with butyl acetate to a solids content of about 60%.

TABLE 7

Acrylic resins recipe

|  | Intakes (parts by weight) |
|---|---|
| Initial reactor charge | |
| GE9H | 164.40 |
| Xylene | 147.84 |
| Monomer mixture | |
| Acrylic acid | 53.11 |
| Butyl methacrylate | 76.88 |
| Butyl acrylate | 48.82 |
| Hydroxy-ethyl methacrylate | 27.20 |
| Styrene | 177.41 |
| Methyl methacrylate | 47.31 |
| Initiator | |
| Di-tert.-amyl peroxide (DTAP) | 8.87 |
| Post addition | |
| Di-tert.-amyl peroxide | 5.91 |
| Solvent (to dilute to 60% solids) | |
| Butyl acetate | 246.00 |
| Total | 1000.0 |

Clear Lacquer Formulation

Clear lacquers are formulated (see Table 8) from the acrylic polymers by addition of Cymel 1158 (curing agent from CYTEC), and solvent to dilute to spray viscosity. The acidity of the polymer is sufficient to catalyze the curing process, therefore no additional acid catalyst is added. The lacquer is stirred well to obtain a homogeneous composition.

TABLE 8

Clear lacquer formulations and properties of the polymers

|  | Intakes (part by weight) |
|---|---|
| Ingredients | |
| Acrylic polymer | 60.0 |
| Cymel 1158 | 8.8 |
| Butyl acetate (to application viscosity) | 24.1 |
| Properties | |
| Solids content [% m/m] | 45.3 |
| Density [g/ml] | 0.97 |
| VOC [g/l] | 531 |

Application and Cure

The coatings are applied with a barcoater on Q-panels to achieve a dry film thickness of about 40 μm. The systems are flashed-off at room temperature for 15 minutes, then baked at 140° C. for 30 minutes. Tests on the cured systems are carried out after 1 day at 23° C.

Example 09

In a reactor equipped with an anchor stirrer, a thermometer, condenser and monomer/initiator feeding system, 188.6 g of GE9H and 90 g of ethoxypropanol (EPR) were loaded and heated to about 150° C. (see Table 9). A mixture of 52 g of hydroxyethylmethacrylate (HEMA), 160 g of styrene, 68 g of acrylic acid (AA), 10 g of dicumylperoxide (DCP), 37.7 g of GE9H and 40 g of ethoxypropanol (EPR) were added over 2 hours 30 minutes to the reactor while keeping its content at 150° C. After the feed, the reactor content was held for 30 minutes at this temperature. After the 30 minutes hold period, 108 g of HEMA, 30 g of AA, 142 g of isobutyl methacrylate (IBMA), 5 g of DCP and 45 grams of EPR were added over 2 hours and 30 minutes at about 150° C. followed by a rinsing step for the feed system with 5 g of EPR. After the rinsing step, the content of the reactor was held for 2 hours at 150° C. The reactor content was cooled down to 100° C. and 100 parts of EPR were distilled off at atmospheric pressure.

The polyacrylate polyol has a solids content of the solution of 90% by weight.

TABLE 9

Composition of polyol

| | Materials | Intake (g) |
|---|---|---|
| Initial charge | EPR | 90 |
| | GE9H | 188.6 |
| Monomer Addition 1 | AA | 68 |
| | Styrene | 160 |
| | GE9H | 37.7 |
| | HEMA | 52 |
| | EPR | 40 |
| | DCP | 10 |
| Monomer Addition 2 | AA | 30 |
| | IBMA | 142 |
| | HEMA | 108 |
| | DCP | 5 |
| | EPR | 45 |
| TOTAL | | 976.3 |

Example 10 Comparative

Monopentaerythritol, methylhexahydrophthalic anhydride and n-Butyl Acetate (see 1°/in Table 10) were charged to a reaction vessel and heated at 140° C. until complete conversion. Cardura E10P (see 1°/in Table 10) was then dropwise added and the reaction pursued until acceptable acid value. The polyester had a solid content of 76.0 wt %. At a suitable temperature, Cardura E10P and xylene (see 2°/in Table 10) were then added. The mixture was heated to about 157° C. and the monomers, radical initiator and solvent (see 3°/in Table 10) were fed for 6 hours at that temperature. A post-cooking (1 h) then took place with additional radical initiator (see 4°/in Table 10). After further addition of n-butyl acetate (see 5°/in Table 10), the final resin had a solid content of 66.2 wt %.

Example 11

Recipe of example 10 was used with the amount indicated in Table 10 while using GE9H instead of Cardura E10P for the polyester cooking. The intermediate polyester and the final resin had a solid content of 78.4 wt % and 66.8 wt %, respectively.

Example 12

Recipe of example 11 was used with the amount indicated in Table 10 while using GE9H instead of Cardura E10P for the acrylic polyol cooking. The intermediate polyester and the final resin had a solid content of 78.4 wt % and 68.3 wt %, respectively.

TABLE 10

Constituents for the polyester based acrylic polyol cooking

| | Example 10 | Example 11 | Example 12 |
|---|---|---|---|
| 1°/Polyester cooking, constituent (g) | | | |
| Monopentaerythritol | 4.0 | 4.2 | 3.4 |
| Methylhexahydrophthalic anhydride | 15.2 | 15.9 | 12.7 |
| n-Butyl acetate | 10.0 | 10.4 | 8.3 |
| Cardura E10P | 22.3 | | |
| GE9H | | 21.9 | 17.5 |
| 2°/Acrylic polyol cooking, initial reactor charge (g) | | | |
| Polyester (from above) | 51.5 | 52.3 | 41.8 |
| Cardura E10P | 33.2 | 31.3 | — |
| GE9H | — | — | 24.9 |
| Xylene | 3.6 | 3.4 | 2.9 |
| 3°/Acrylic polyol cooking, feeding material (g) | | | |
| Acrylic Acid | 9.5 | 9.0 | 7.6 |
| Hydroxyethyl methacrylate | 23.9 | 22.5 | 19.0 |
| Styrene | 39.8 | 37.5 | 31.7 |
| Butyl Acrylate | 0.0 | 0.0 | 0.8 |
| Methyl methacrylate | 26.3 | 24.8 | 21.6 |
| Xylene | 11.0 | 10.4 | 8.8 |
| Di-t-Amyl Peroxide | 5.3 | 5.0 | 4.2 |
| 4°/Acrylic polyol post cooking, feeding material (g) | | | |
| Di-t-Amyl Peroxide | 1.3 | 1.3 | 1.1 |
| 5°/Acrylic polyol solid content adjustment, solvent adding (g) | | | |
| n-Butyl acetate | 55.7 | 52.6 | 44.4 |

Formulation of the Clear Coats

A clear coat is formulated with one of the polyester based acrylic polyol (from examples 10, 11 or 12, the curing agent (HDL Desmodur N3390), the thinner, the levelling agent (BYK-331) and the catalyst (dibutyltin dilaurate, DBTDL) according to the amounts indicated in Table 11.

TABLE 11

Clear coats, formulations

| CE-Example | Binder (ID) | Binder (g) | HDI (g) | BYK 10 wt % (g) | DBTDL 1 wt % (g) | Thinner A (g) |
|---|---|---|---|---|---|---|
| CE-10 | From Example 10 | 92.1 | 34.7 | 0.67 | 1.47 | 37.2 |
| CE-11 | From Example 11 | 91.3 | 36.0 | 0.66 | 1.46 | 37.4 |
| CE-12 | From Example 12 | 91.3 | 36.9 | 0.68 | 1.50 | 39.7 |

Characterization of the Clear Coats

The clearcoat formulations (from Table 11) are applied with a barcoater on degreased Q-panel. The panels are dried at room temperature, optionally with a preliminary stoving at 60° C. for 30 min. Clear coats have been characterized among others by measuring the dust free time and Koenig hardness development (see Table 12).

TABLE 12

Clear coats, drying (curing) properties

|  | CE-10 | CE-11 | CE-12 |
|---|---|---|---|
| 1°/Dust free time (Room temperature drying panels) (min) | | | |
| Dust free time (min) | 39 | 35 | 24 |
| 2°/Koenig Hardness (Room temperature drying panels) (sec) | | | |
| 6 hours | 3 | 4 | 7 |
| 24 hours | 31 | 38 | 49 |
| 7 days | 156 | 167 | 179 |
| 3°/Koenig Hardness (Stoved Q panels) (sec) | | | |
| Out of the oven | 12 | 15 | 24 |
| 6 hours | 15 | 18 | 29 |
| 24 hours | 48 | 55 | 67 |
| 7 days | 178 | 180 | 190 |

Observation (see Table 12): significant improvement (lower dust free time and quicker hardness development) is observed when replacing Cardura E10P by GE9H for the polyester cooking. Improvement is even more significant when Cardura E10P is complementary replaced by GE9H for the acrylic polyol cooking.

Example 13

Maleate Diester Based Resin Prepared According to the Teaching of WO2005040241

Equipment: Glass reactor equipped with an anchor stirrer, reflux condenser and nitrogen flush.

Manufacturing Procedure of the Maleate Diester:

Maleic anhydride was reacted with the selected alcohol (3,3,5 trimethyl cyclohexanol) in an equimolar ratio at 110° C. to form a maleate monoester in presence of around 5 wt % butyl acetate. The reaction was continued until conversion of the anhydride had reached at least 90% (Conversion of the anhydride is monitored by acid-base titration.). Methanol was added to open the remaining anhydride in a 1.2/1 molar ratio of methanol/anhydride and the reaction was continued for 30 minutes.

GE9H was fed to the reactor in 30 minutes in an equimolar ratio to the remaining acid in the system whilst keeping the temperature at 110° C. The system was then allowed to react further for 1 hour at 110° C.

Manufacturing procedure of the maleate-acrylic resin (see Table 13):

TABLE 13

Composition of TMCH maleate based resin

| | | Parts by weight |
|---|---|---|
| Initial Reactor Charge [g] | BuAc | 8 |
| | Maleate diester | 40.7 |
| Initiator start [g] | Di tert amyl peroxide | 0.4 |
| Monomer feed [g] | BuAc | 3 |
| | Hydroxyethyl methacrylate | 21.5 |
| | Styrene | 20 |
| | Methyl methacrylate | 17.8 |
| | Methacrylic Acid | 2.2 |
| | Di tert amyl peroxide | 3.6 |
| Post cooking [g] | DTAP (with 10 g BuAc) | 1 |
| Total intake [g] | | 118.2 |

The reactor was flushed with nitrogen and the initial reactor charge was heated to the polymerization temperature of 150° C. The first charge of Di ter-amylperoxide was then added in one shot. Immediately after this addition, the monomer-initiator mixture was dosed continuously to the reactor in 330 minutes at the same temperature. The monomer addition feed rate was halved during the last hour of monomer addition. After completion of the monomer addition, the third charge of Di ter-amylperoxide was then fed together with a small amount of the butyl acetate to the reactor in 15 minutes. The reactor was kept at this temperature for 60 more minutes. Finally, the polymer was cooled down. Resin characteristics are in Table 14.

TABLE 14

Resin characteristics of the TMCH maleate based resin

| Solids content, % | 87.5 |
|---|---|
| Acid value, mg KOH/g | 13 |
| Colour, Pt/Co | 35 |
| Mw | 2950 |
| Mn | 1697 |
| Mwd | 1.74 |

Example 14

Polyester-Ether Resin

The following constituents were charged to a reaction vessel equipped with a stirrer, a thermometer and a condenser: 456 g of GE9H, 134 g of dimethylolpropionic acid and 0.35 g of stannous octoate.

The mixture was heated to a temperature of about 110° C. for about 1 hour and then steadily increased to 150° C. in 3 hours and then cooled down. After cooling down the polyester-ether had an epoxy group content of 4 mmol/kg, a solids content of about 99% a viscosity of 254000 cP an acid value of 1.3 mg KOH/g and a theoretical OH content of 285 mg KOH/g.

This polyester-ether was then formulated in high solids and very high solids 2K polyurethane topcoats either as sole binder or as reactive diluent for an acrylic polyol.

The following examples the polyol dispersion is formulated in 2K waterborne polyurethane topcoats. Optionally the aqueous dispersion is made in the presence of additional other one polyol(s), or the aqueous dispersion is combined with additional other polyol dispersion(s), then formulated in 2K waterborne polyurethane topcoats.

Example 15 Comparative

The following constituents were charged into a reaction vessel under nitrogen flush equipped with a stirrer, a condenser and a thermometer: 300 grams of Cardura™ E10, 100 grams of butyl glycol. That initial reactor charge has been heated up to 140° C. Then, the following mixture was added over a period of 4 hrs while keeping the temperature constant: 89 grams of acrylic acid, 140 grams of Hydroxyethyl methacrylate, 200 grams of Styrene, 90 grams of Butyl Acrylate, 133 grains of Methyl methacrylate, 24 grams of Di-t-Amyl Peroxide. After that, a second mixture was added over a period of 30 minutes while keeping the same temperature: 48 grams of Acrylic Acid, 1 gram of Di-t-Amyl Peroxide. After further adding 5 grams of Di-t-Amyl Peroxide, a post-cooking was pursued at the same temperature for 2 hrs.

The obtained polyol has an Acid Value of about 30 mgKOH, a TgFox of 33° C. and a solids content of about 90%.

The obtained polyol was then cooled down to 80° C., and a quantity of N,N-di-methyl ethanolamine was added into the vessel to neutralize 80% of the acid groups. The vessel was stirred for another 15 minutes before starting the preparation of the aqueous dispersion.

The aqueous dispersion is obtained by adding demi water pre-heated at 70° C. gradually into the vessel over a period of 2 hours under adequate agitation. The dispersion obtained has a solid content of about 40%, a pH of about 7.5 and a particle size of 146 nm.

Example 16 Comparative

The following constituents were charged into a reaction vessel under nitrogen flush equipped with a stirrer, a condenser and a thermometer: 300 grams of Cardura™ E10, 100 grams of butyl glycol. That initial reactor charge has been heated up to 140° C. Then, the following mixture was added over a period of 4.5 hrs while keeping the temperature constant: 137 grams of acrylic acid, 140 grams of Hydroxyethyl methacrylate, 200 grams of Styrene, 90 grams of Butyl Acrylate, 133 grams of Methyl methacrylate, 25 grams of Di-t-Amyl Peroxide. After further adding 5 grams of Di-t-Amyl Peroxide, a post-cooking was pursued at the same temperature for 2 hrs.

The obtained polyol has an Acid Value of about 30 mgKOH, a TgFox of 33° C. and a solids content of about 90%.

The obtained polyol was then cooled down to 80° C., and a quantity of N,N-di-methyl ethanolamine was added into the vessel to neutralize 80% of the acid groups. The vessel was stirred for another 15 minutes before starting the preparation of the aqueous dispersion.

The aqueous dispersion is obtained by adding demi water pre-heated at 70° C. gradually into the vessel over a period of 2 hours under adequate agitation. The dispersion obtained has a solid content of about 40%, a pH of about 7.5 and a particle size of 147 nm.

Example 17 Comparative

The following constituents were charged into a reaction vessel under nitrogen flush equipped with a stirrer, a condenser and a thermometer: 300 grams of Cardura™ E10, 100 grams of butyl glycol. That initial reactor charge has been heated up to 140° C. Then, the following mixture was added over a period of 4.5 hrs while keeping the temperature constant: 137 grams of acrylic acid, 140 grams of Hydroxyethyl methacrylate, 200 grams of Styrene, 223 grams of Methyl methacrylate, 25 grams of Di-t-Amyl Peroxide. After further adding 5 grams of Di-t-Amyl Peroxide, a post-cooking was pursued at the same temperature for 2 hrs.

The obtained polyol has an Acid Value of about 30 mgKOH, a TgFox of 49° C. and a solids content of about 90%.

The obtained polyol was then cooled down to 80° C., and a quantity of N,N-di-methyl ethanolamine was added into the vessel to neutralized 80% of the acid groups. The vessel was stirred for another 15 minutes before starting the preparation of the aqueous dispersion.

The aqueous dispersion is obtained by adding demi water pre-heated at 70° C. gradually into the vessel over a period of 2 hours under adequate agitation. The dispersion obtained has a solid content of about 40%, a pH of about 7.5 and a particle size of 161 nm.

Example 18

The following constituents were charged into a reaction vessel under nitrogen flush equipped with a stirrer, a condenser and a thermometer: 300 grams of GE9H, 100 grams of butyl glycol. That initial reactor charge has been heated up to 140° C. Then, the following mixture was added over a period of 4.5 hrs while keeping the temperature constant: 143 grams of acrylic acid, 135 grams of Hydroxyethyl methacrylate, 200 grams of Styrene, 240 grams of Methyl methacrylate, 25 grams of Di-t-Amyl Peroxide. After further adding 5 grams of Di-t-Amyl Peroxide, a post-cooking was pursued at the same temperature for 2 hrs.

The obtained polyol has an Acid Value of about 30 mgKOH, a TgFox of about 64° C. and a solids content of about 90%.

The obtained polyol was then cooled down to 80° C., and a quantity of N,N-di-methyl ethanolamine was added into the vessel to neutralized 80% of the acid groups. The vessel was stirred for another 15 minutes before starting the preparation of the aqueous dispersion.

The aqueous dispersion is obtained by adding demi water pre-heated at 70° C. gradually into the vessel over a period of 2 hours under adequate agitation. The dispersion obtained has a solid content of about 40%, a pH of about 7.5 and a particle size of 150 nm.

Example 19 Comparative

The following constituents were charged into a reaction vessel under nitrogen flush equipped with a stirrer, a condenser and a thermometer: 300 grams of GE9S, 100 grams of butyl glycol. That initial reactor charge has been heated up to 140° C. Then, the following mixture was added over a period of 4.5 hrs while keeping the temperature constant: 143 grams of acrylic acid, 135 grams of Hydroxyethyl methacrylate, 200 grams of Styrene, 240 grams of Methyl methacrylate, 25 grams of Di-t-Amyl Peroxide. After further adding 5 grams of Di-t-Amyl Peroxide, a post-cooking was pursued at the same temperature for 2 hrs.

The obtained polyol has an Acid Value of about 30 mgKOH, a TgFox of about 49° C. and a solids content of about 90%.

The obtained polyol was then cooled down to 80° C., and a quantity of N,N-di-methyl ethanolamine was added into the vessel to neutralized 80% of the acid groups. The vessel was stirred for another 15 minutes before starting the preparation of the aqueous dispersion.

The aqueous dispersion is obtained by adding demi water pre-heated at 70° C. gradually into the vessel over a period of 2 hours under adequate agitation.

Example 20 Comparative

The following constituents were charged into a reaction vessel under nitrogen flush equipped with a stirrer, a condenser and a thermometer: 100 grams of Mono PentaErythritol and 376 grams of MethylHexaHydroPhthalic Anhydride. That initial reactor charge has been heated up to 150° C. under agitation until the resulting mixture became homogenous and transparent. Then, 624 grams of Cardura™ E10 is added into the vessel. The following mixture is then added over a period of 4 hours while keeping the temperature constant: 110 grams of acrylic acid, 200 grams of Hydroxyethyl methacrylate, 400 grains of Styrene, 190 grams of Methyl methacrylate, 60 grams of Di-t-Amyl Peroxide. After further adding 10 grams of Di-t-Amyl Peroxide, a post-cooking was pursued at the same temperature for 2 hrs.

The obtained polyol has an Acid Value of about 30 mgKOH, a solids content of about 100%.

The obtained polyol was then cooled down to 80° C., and a quantity of N,N-di-methyl ethanolamine was added into the vessel to neutralized 80% of the acid groups. The vessel was stirred for another 15 minutes before starting the preparation of the aqueous dispersion.

The aqueous dispersion is obtained by adding demi water pre-heated at 70° C. gradually into the vessel over a period of 2 hours under adequate agitation. The dispersion obtained has a solid content of about 40%.

Example 21

The following constituents were charged into a reaction vessel under nitrogen flush equipped with a stirrer, a condenser and a thermometer: 103 grams of Mono PentaErythritol and 389 grams of MethylHexaHydroPhthalic Anhydride. That initial reactor charge has been heated up to 150° C. under agitation until the resulting mixture became homogenous and transparent. Then, 608 grams of GE9H is added into the vessel. The following mixture is then added over a period of 4 hours while keeping the temperature constant: 112 grams of acrylic acid, 200 grams of Hydroxyethyl methacrylate, 400 grams of Styrene, 190 grams of Methyl methacrylate, 60 grams of Di-t-Amyl Peroxide. After further adding 10 grams of Di-t-Amyl Peroxide, a post-cooking was pursued at the same temperature for 2 hrs.

The obtained polyol has an Acid Value of about 30 mgKOH, a solids content of about 100%.

The obtained polyol was then cooled down to 80° C., and a quantity of N,N-di-methyl ethanolamine was added into the vessel to neutralized 80% of the acid groups. The vessel was stirred for another 15 minutes before starting the preparation of the aqueous dispersion.

The aqueous dispersion is obtained by adding demi water pre-heated at 70° C. gradually into the vessel over a period of 2 hours under adequate agitation. The dispersion obtained has a solid content of about 40%.

Example 22 Comparative

The following constituents were charged into a reaction vessel under nitrogen flush equipped with a stirrer, a condenser and a thermometer: 103 grams of Mono PentaErythritol and 389 grams of MethylHexahydroPhthalic Anhydride. That initial reactor charge has been heated up to 150° C. under agitation until the resulting mixture became homogenous and transparent. Then, 608 grams of GE9S is added into the vessel. The following mixture is then added over a period of 4 hours while keeping the temperature constant: 112 grams of acrylic acid, 200 grams of Hydroxyethyl methacrylate, 400 grams of Styrene, 190 grams of Methyl methacrylate, 60 grams of Di-t-Amyl Peroxide. After further adding 10 grams of Di-t-Amyl Peroxide, a post-cooking was pursued at the same temperature for 2 hrs.

The obtained polyol has an Acid Value of about 30 mgKOH, a solids content of about 100%.

The obtained polyol was then cooled down to 80° C., and a quantity of N,N-di-methyl ethanolamine was added into the vessel to neutralized 80% of the acid groups. The vessel was stirred for another 15 minutes before starting the preparation of the aqueous dispersion.

The aqueous dispersion is obtained by adding demi water pre-heated at 70° C. gradually into the vessel over a period of 2 hours under adequate agitation. The dispersion obtained has a solid content of about 40%.

We claim:

1. A hydroxyl functional acrylic resin composition prepared from a mixture of α,α-branched alkane carboxylic glycidyl esters wherein a sum of the concentration of blocked and of highly branched isomers is at least 50 wt % based on the total weight of the mixture and wherein the mixture of α,α-branched alkane carboxylic glycidyl esters is selected from the group consisting of 2,2-dimethyl 3,3-dimethyl pentanoic acid glycidyl ester, 2-methyl 2-isopropyl 3-methyl butanoic acid glycidyl ester, 2-methyl 2-ethyl 3,3-dimethyl butanoic acid glycidyl ester, 2,2-dimethyl 3-methyl 4-methyl pentanoic acid glycidyl ester, 2,2-dimethyl 4,4-dimethyl pentanoic acid glycidyl ester, and combinations of any two or more thereof.

2. The composition of claim 1 wherein the mixture of α,α-branched alkane carboxylic glycidyl esters is based on a neononanoic (C9) acid mixture wherein the sum of the concentration of the blocked and of the highly branched isomers is at least 50 wt % based on the total weight of the mixture.

3. The composition of claim 1 wherein the mixture of α,α-branched alkane carboxylic glycidyl esters comprises 2,2-dimethyl 3,3-dimethyl pentanoic acid glycidyl ester, 2-methyl 2-isopropyl 3-methyl butanoic acid glycidyl ester and 2-methyl 2-ethyl 3,3-dimethyl butanoic acid glycidyl ester in an amount above 10 wt % based on the weight of the mixture.

4. The composition of claim 3 wherein the mixture of α,α-branched alkane carboxylic glycidyl esters comprises 2,2-dimethyl 3,3-dimethyl pentanoic acid glycidyl ester, 2-methyl 2-isopropyl 3-methyl butanoic acid glycidyl ester and 2-methyl 2-ethyl 3,3-dimethyl butanoic acid glycidyl ester in an amount above 15 wt % based on the total weight of the mixture.

5. The composition of claim 3 wherein the mixture of α,α-branched alkane carboxylic glycidyl esters comprises 2,2-dimethyl 3,3-dimethyl pentanoic acid glycidyl ester, 2-methyl 2-isopropyl 3-methyl butanoic acid glycidyl ester and 2-methyl 2-ethyl 3,3-dimethyl butanoic acid glycidyl ester in an amount above 25 wt % based on the total weight of the mixture.

6. The composition of claim 2 wherein the sum of the concentration of the blocked isomers and of the highly branched isomers is above 60 wt % based on the total weight of the mixture.

7. The composition of claim 2 wherein the sum of the concentration of the blocked isomers and of the highly branched isomers is above 75 wt % based on the total weight of the mixture.

8. The composition of claim 1 wherein the mixture of α,α-branched alkane carboxylic glycidyl esters comprises 2,2-dimethyl 3,3-dimethyl pentanoic acid glycidyl ester, 2-methyl 2-isopropyl 3-methyl butanoic acid glycidyl ester, 2-methyl 2-ethyl 3,3-dimethyl butanoic acid glycidyl ester, 2,2-dimethyl 3-methyl 4-methyl pentanoic acid glycidyl ester and 2,2-dimethyl 4,4-dimethyl pentanoic acid glycidyl ester in an amount above 40 wt % based on the weight of the mixture.

9. The composition of claim 8 wherein the mixture of α,α-branched alkane carboxylic glycidyl esters 2,2-dimethyl 3,3-dimethyl pentanoic acid glycidyl ester, 2-methyl 2-isopropyl 3-methyl butanoic acid glycidyl ester, 2-methyl 2-ethyl 3,3-dimethyl butanoic acid glycidyl ester, 2,2-dimethyl 3-methyl 4-methyl pentanoic acid glycidyl ester and 2,2-dimethyl 4,4-dimethyl pentanoic acid glycidyl ester in an amount above 50w t % based on the weight of the mixture.

10. The composition of claim 8 wherein the mixture of α,α-branched alkane carboxylic glycidyl esters 2,2-dimethyl 3,3-dimethyl pentanoic acid glycidyl ester, 2-methyl 2-isopropyl 3-methyl butanoic acid glycidyl ester, 2-methyl 2-ethyl 3,3-dimethyl butanoic acid glycidyl ester, 2,2-dimethyl 3-methyl 4-methyl pentanoic acid glycidyl ester and 2,2-dimethyl 4,4-dimethyl pentanoic acid glycidyl ester in an amount above 60 wt % based on the weight of the mixture.

11. The composition of claim 1 wherein the mixture of α,α-branched alkane carboxylic glycidyl esters comprises 2-methyl 2-ethyl hexanoic acid glycidyl ester in an amount of below 40 wt % based on the weight of the mixture.

12. The composition of claim 11 wherein the mixture of α,α-branched alkane carboxylic glycidyl esters comprises 2-methyl 2-ethyl hexanoic acid glycidyl ester in an amount of below 30 wt % based on the weight of the mixture.

13. The composition of claim 11 wherein the mixture of α,α-branched alkane carboxylic glycidyl esters comprises 2-methyl 2-ethyl hexanoic acid glycidyl ester in an amount of below 20 wt % based on the weight of the mixture.

14. A process to prepare the hydroxyl functional acrylic resin composition of claim 1 comprising incorporating the mixture of α,α-branched alkane carboxylic glycidyl esters comprising epoxy groups into a hydroxyl functional acrylic resins by the reaction of the epoxy group with a carboxylic acid group of ethylene carboxylic acid compounds from hydroxyl ethylene carboxylate ester monomers which are then reacted with one or more unsaturated monomers via a radical polymerization reaction, in one step or more.

15. The composition of claim 1 having a calculated hydroxyl value between 50 and 180 mgKOH/g on solids, or a number average molecular weight (Mn) between 2500 and 50000 Dalton measured according to polystyrene standard.

16. A binder composition useful for a coating composition comprising the hydroxyl functional acrylic resin composition of claim 1.

17. A metal or plastic substrate coated with a coating composition comprising the binder composition of the claim 16.

18. The hydroxyl functional acrylic resin composition of claim 1 prepared in presence of a polyester polyol.

19. The composition of claim 1 wherein the sum of the concentration of the blocked isomers and of the highly branched isomers is above 60 wt % based on the total weight of the mixture.

20. The composition of claim 1 wherein the sum of the concentration of the blocked isomers and of the highly branched isomers is above 75 wt % based on the weight of the mixture.

21. The composition of claim 1 wherein the mixture of α,α-branched alkane carboxylic glycidyl esters is derived from butene oligomers.

* * * * *